(12) United States Patent
Al Ramady et al.

(10) Patent No.: US 10,944,622 B2
(45) Date of Patent: Mar. 9, 2021

(54) ROOT CAUSE ANALYSIS FOR UNIFIED COMMUNICATIONS PERFORMANCE ISSUES

(71) Applicant: Saudi Arabian Oil Company, Dhahran (SA)

(72) Inventors: Baher Y. Al Ramady, Dammam (SA); Zahrah Almousa, Dammam (SA); Mawada M. Felemban, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/193,834

(22) Filed: Nov. 16, 2018

(65) Prior Publication Data
US 2020/0162311 A1    May 21, 2020

(51) Int. Cl.
| H04L 12/24 | (2006.01) |
| H04L 12/26 | (2006.01) |
| H04L 29/06 | (2006.01) |

(52) U.S. Cl.
CPC ...... *H04L 41/0631* (2013.01); *H04L 43/0829* (2013.01); *H04L 43/0847* (2013.01);
(Continued)

(58) Field of Classification Search
CPC .. H04L 43/0829; H04L 43/0847; H04L 43/12
See application file for complete search history.

(56) References Cited

U.S. PATENT DOCUMENTS

| 5,864,662 A | 1/1999 | Brownmiller et al. |
| 6,072,777 A | 6/2000 | Bencheck et al. |
(Continued)

FOREIGN PATENT DOCUMENTS

| EP | 3211831 | 8/2017 |
| GB | 2481422 | 12/2011 |
| WO | WO2017072614 | 5/2017 |

OTHER PUBLICATIONS

PCT International Search Report and Written Opinion in International Appln. PCT/US2019/061441, dated Feb. 4, 2020, 14 pages.
(Continued)

*Primary Examiner* — Redentor Pasia
(74) *Attorney, Agent, or Firm* — Fish & Richardson P.C.

(57) ABSTRACT

Methods, systems, and computer-readable medium to perform operations comprising determining a plurality of metrics of data trafficked through a session border controller (SBC), the SBC in communication with an endpoint device and positioned along a data transmission connection between a network and a IP multi-media subsystem (IMS); detecting a packet loss performance metric of the data; in response to detecting the packet loss, determining that a retransmission of the SBC is degraded; in response to determining that the retransmission of the SBC is degraded, determining that an endpoint network response time (NRT) is degraded; in response to determining that the endpoint NRT is degraded, determining that an endpoint signaling response time (ART) is degraded; and in response to determining that the endpoint ART is degraded, identifying the endpoint device as a root cause of the packet loss performance metric of the data.

20 Claims, 5 Drawing Sheets

(52) U.S. Cl.
CPC ............ *H04L 43/12* (2013.01); *H04L 65/102* (2013.01); *H04L 65/1016* (2013.01); *H04L 65/80* (2013.01)

(56) References Cited

U.S. PATENT DOCUMENTS

| | | | |
|---|---|---|---|
| 7,237,138 B2 | 6/2007 | Greenwald et al. | |
| 7,428,300 B1 | 9/2008 | Drew | |
| 7,600,007 B1 | 10/2009 | Lewis | |
| 8,782,225 B2 | 7/2014 | Bali | |
| 9,432,865 B1 | 8/2016 | Jadunandan et al. | |
| 9,491,764 B1 | 11/2016 | Ross et al. | |
| 9,729,414 B1 | 11/2017 | Oliveira et al. | |
| 10,116,539 B1 | 10/2018 | Fuchs et al. | |
| 10,045,252 B2 | 11/2018 | Agarwal et al. | |
| 10,191,778 B1 | 1/2019 | Yang et al. | |
| 10,313,213 B1 | 6/2019 | Aygun | |
| 10,567,243 B2 | 2/2020 | Tippenhauer et al. | |
| 10,601,684 B2 | 3/2020 | Hasmi et al. | |
| 10,644,979 B2 | 3/2020 | Samadi | |
| 10,680,889 B2 | 6/2020 | Vasseur et al. | |
| 2001/0039577 A1 | 11/2001 | Barkai et al. | |
| 2003/0126254 A1 | 7/2003 | Cruickshank, III et al. | |
| 2003/0145081 A1 | 7/2003 | Lau | |
| 2003/0225549 A1 | 12/2003 | Shay et al. | |
| 2004/0064760 A1 | 4/2004 | Hicks et al. | |
| 2004/0103181 A1 | 5/2004 | Chambliss | |
| 2006/0056389 A1 | 3/2006 | Monk | |
| 2006/0182034 A1 | 8/2006 | Klinker et al. | |
| 2006/0215564 A1 | 9/2006 | Breitgand et al. | |
| 2006/0221876 A1 | 10/2006 | Kosanovic et al. | |
| 2006/0276995 A1 | 12/2006 | Breitgand et al. | |
| 2006/0293777 A1 | 12/2006 | Breitgand et al. | |
| 2008/0016412 A1 | 1/2008 | White et al. | |
| 2008/0027961 A1 | 1/2008 | Arlitt et al. | |
| 2008/0049753 A1 | 2/2008 | Heinze et al. | |
| 2009/0059895 A1 | 3/2009 | Yasrebi | |
| 2009/0089438 A1 | 4/2009 | Agarwal et al. | |
| 2009/0181665 A1 | 7/2009 | Sater et al. | |
| 2010/0088410 A1 | 4/2010 | Ridley | |
| 2010/0103822 A1 | 4/2010 | Montwill | |
| 2010/0211673 A1 | 8/2010 | Kosbab et al. | |
| 2011/0129071 A1 | 6/2011 | Blackburn et al. | |
| 2011/0295942 A1 | 12/2011 | Raghunath et al. | |
| 2012/0163386 A1 | 6/2012 | Wang | |
| 2013/0021933 A1 | 1/2013 | Kovvali et al. | |
| 2013/0107715 A1 | 5/2013 | Szabo et al. | |
| 2013/0242775 A1 | 9/2013 | Taylor | |
| 2013/0304842 A1 | 11/2013 | Zachariassen et al. | |
| 2014/0189097 A1 | 7/2014 | Sidi | |
| 2014/0192668 A1 | 7/2014 | Yamany et al. | |
| 2015/0089054 A1 | 3/2015 | Rizzi et al. | |
| 2015/0128056 A1 | 5/2015 | Rizzi et al. | |
| 2015/0138989 A1 | 5/2015 | Polehn | |
| 2015/0149631 A1 | 5/2015 | Lissack | |
| 2016/0155076 A1 | 6/2016 | Fix et al. | |
| 2016/0162346 A1 | 6/2016 | Kushnir et al. | |
| 2016/0360361 A1 | 12/2016 | Ross et al. | |
| 2017/0046243 A1 | 2/2017 | Shinde | |
| 2017/0111807 A1 | 4/2017 | Townend et al. | |
| 2017/0126475 A1 | 5/2017 | Mahkonen et al. | |
| 2017/0237851 A1* | 8/2017 | Hassan | H04L 41/142 370/252 |
| 2017/0250880 A1* | 8/2017 | Akens | H04L 41/0631 |
| 2017/0279703 A1 | 9/2017 | Wasmundt et al. | |
| 2017/0302505 A1 | 10/2017 | Zafer et al. | |
| 2017/0302553 A1 | 10/2017 | Zafer et al. | |
| 2017/0353991 A1 | 12/2017 | Tapia et al. | |
| 2017/0359272 A1 | 12/2017 | Srinivasan et al. | |
| 2018/0024867 A1 | 1/2018 | Gilsdorf et al. | |
| 2018/0054772 A1 | 2/2018 | Tan et al. | |
| 2018/0109564 A1 | 4/2018 | Rahman | |
| 2018/0167446 A1 | 6/2018 | Lewis et al. | |
| 2018/0176095 A1 | 6/2018 | Diwakar | |
| 2018/0262414 A1 | 9/2018 | Burbridge | |
| 2018/0270126 A1 | 9/2018 | Tapia | |
| 2018/0343192 A1 | 11/2018 | Antonyraj et al. | |
| 2019/0036772 A1 | 1/2019 | Agerstam et al. | |
| 2019/0052518 A1 | 2/2019 | Gal et al. | |
| 2019/0082286 A1 | 3/2019 | Tata et al. | |
| 2019/0141113 A1 | 5/2019 | Ganapathi et al. | |
| 2019/0141543 A1 | 5/2019 | Ganapathi et al. | |
| 2019/0200243 A1 | 6/2019 | Anand et al. | |
| 2019/0205153 A1 | 7/2019 | Niestemski et al. | |
| 2019/0213514 A1 | 7/2019 | Gonzalez et al. | |
| 2019/0280950 A1 | 9/2019 | Alshafei et al. | |
| 2019/0319868 A1 | 10/2019 | Svennering et al. | |
| 2019/0356535 A1 | 11/2019 | Li et al. | |
| 2019/0363960 A1 | 11/2019 | Fuchs et al. | |
| 2020/0028782 A1 | 1/2020 | Li et al. | |
| 2020/0029240 A1 | 1/2020 | Li et al. | |

OTHER PUBLICATIONS

PCT International Search Report and Written Opinion in International Appln. PCT/US2019/059843, dated Apr. 14, 2020, 14 pages.
PCT International Search Report and Written Opinion in International Appln. PCT/US2019/061443, dated Feb. 12, 2020, 14 pages.
GCC Examination Report in GCC Appln. No. GC 2019-38634, dated Sep. 15, 2020, 3 pages.
GCC Examination Report in GCC Application. No. 2019-38649 dated Oct. 14, 2020, 3 pages.

* cited by examiner

ROOT CAUSE ANALYSIS FOR UNIFIED COMMUNICATIONS PERFORMANCE ISSUES

TECHNICAL FIELD

This disclosure relates to a root cause analysis for unified communications performance issues.

BACKGROUND

Unified communications performance degradation can be perceived through such means as media interruption, lag, delay, and other issues that leads to poor call quality. The degradation can be caused by jitter, packet loss, packet out of order, or network delay.

SUMMARY

The present disclosure discusses performing root cause analysis of unified communications degradation by identifying which portion of an infrastructure is experiencing issues by using an agentless probe at a session border controller. The agentless probe can be utilized to actively collect network and call performance metrics from the end-point devices. Analysis of these performance metrics can be performed to identify the root cause of performance degradation.

Innovative aspects of the subject matter described in this specification may be embodied in methods that include the actions of determining a plurality of metrics of data trafficked through a session border controller (SBC), the SBC in communication with an endpoint device and positioned along a data transmission connection between a network and a IP multi-media subsystem (IMS); detecting a packet loss performance metric of the data; in response to detecting the packet loss, determining that a retransmission of the SBC is degraded; in response to determining that the retransmission of the SBC is degraded, determining that an endpoint network response time (NRT) is degraded; in response to determining that the endpoint NRT is degraded, determining that an endpoint signaling response time (ART) is degraded; and in response to determining that the endpoint ART is degraded, identifying the endpoint device as a root cause of the packet loss performance metric of the data.

Other embodiments of these aspects include corresponding systems, apparatus, and computer programs, configured to perform the actions of the methods, encoded on computer storage devices.

These and other embodiments may each optionally include one or more of the following features. For instance, in response to determining that the endpoint NRT is degraded, determining that the endpoint ART is not degraded; and in response to determining that an endpoint signaling response time ART is not degraded, identifying the network as the root cause of the packet loss performance metric of the data. The endpoint NRT is a network delay including endpoint network response. The endpoint ART is an average time for the endpoint to send two consecutive requests. Retransmission of the SBC is a number of signaling packets retransmitted from the SBC. In response to determining that the retransmission of the SBC is degraded, determining that an endpoint NRT is not degraded; in response to determining that the endpoint NRT is not degraded, determining that a SBC NRT is degraded; in response to determining that the SBC NRT is degraded, determining that a SBC ART is degraded; and in response to determining that the SBC ART is degraded, identifying the SBC and the IMS as the root cause of the packet loss performance metric of data. In response to determining that the SBC NRT is degraded, determining that the SBC ART is not degraded; in response to determining that the SBC ART is not degraded, identifying the network as the root cause of the packet loss performance metric of data. The SBC NRT is an average time for the SBC to respond to a connection. The SBC ART is an average time for SBC to process signaling. In response to detecting the packet loss, determining that the retransmission of the SBC is not degraded; in response to determining that the retransmission of the SBC is not degraded, determining that a retransmission of the endpoint is degraded; in response to determining that the retransmission of the endpoint is degraded, determining that the SBC ART is degraded; and in response to determining that the SBC ART is degraded, identifying the SBC and the IMS as the root cause of the packet loss performance metric of data. The retransmission of the endpoint is a number of signaling packets retransmitted from the endpoint.

Particular implementations of the subject matter described in this specification can be implemented so as to realize one or more of the following advantages. For example, implementation of the subject matter provide identifying a portion of the network where there is a performance degradation affecting the end-users' traffic passing through this portion, without the need of correlating many health statistics that can act as overhead to the monitoring entity. This method is cost effective as the minimum number of probes and metrics are used to achieve the goal. Moreover, this can tackle logical issues related to call quality such as media interruption, lag, delay, etc. The process can provide real-time identification of the issue with minimum or fewer sources of inputs.

The details of one or more implementations of the subject matter described in this disclosure are set forth in the accompanying drawings and the description herein. Other features, aspects, and advantages of the subject matter will become apparent from the description, the drawings, and the claims.

DETAILED DESCRIPTION

Figure 1:
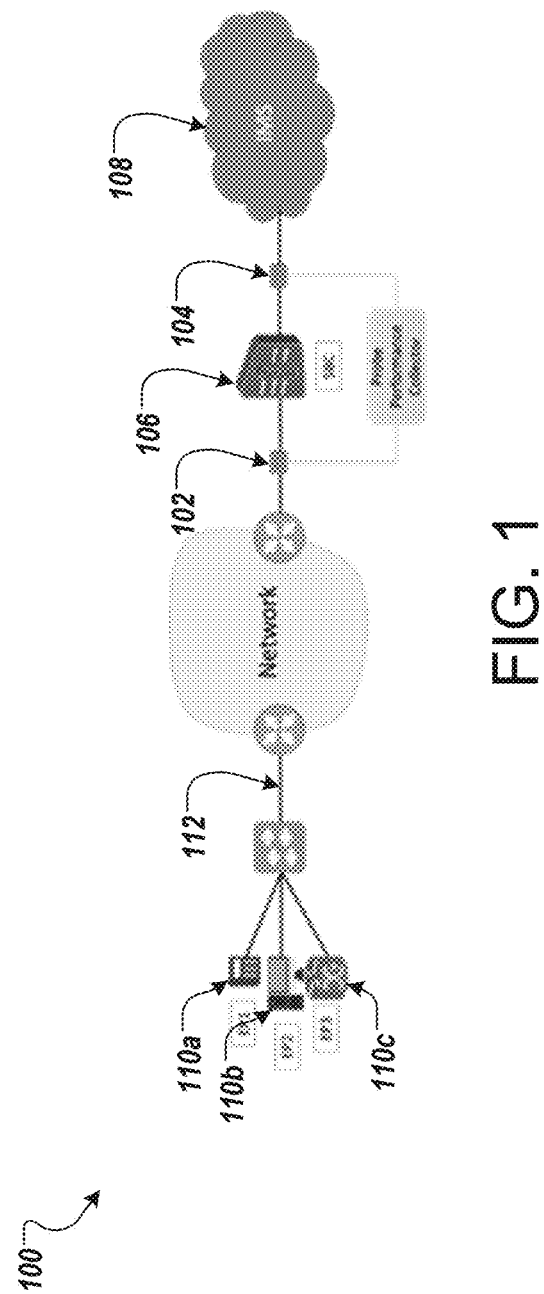
FIGS. 1 and 2 are schematic illustrations of a system for determining the root cause of unified communication performance degradation.

The present disclosure describes a network infrastructure including at least one agentless probe located at a location of the network infrastructure where the traffic of most endpoints can be captured and calculated. A correlation between the network and call performance metrics can be calculated to identify one or more portions of the network infrastructure that are causing the performance degradation. Specifically, FIG. 1 illustrates a computing environment 100 that includes a first probe performance collector 102, a second probe performance collator 104, a session border controller (SBC) 106, a network 107, an IP multi-media subsystem (IMS) 108, and end-point devices 110*a*, 110*b*, 110*c* (collectively referred to as end-point devices 110). Each of the performance collectors 102, 104, the SBC 106, the network 107, the IMS 108, and the end-point devices 110 can be in communication along a data transmission connection 112. The end-point devices 110 can include any voice capable devices that is assigned at least an IP address, interact and transfer signaling and media through the network 107 to the SBC 106. For example, the end-point devices 110 can include an IP phone, PC client, media gateway.

In short, the system 100 provides for root cause analysis of unified communication performance degradation by identifying one or more portions—the end-point devices 110, the network 107, SBC 106, the IMS 108—of the system 100 that is experiencing an issue. In some examples, the performance degradation can be associated with media interruption, lag, delay, or other issues that can lead to poor call quality of the system 100. Such performance degradation can be caused by jitter, packet loss, packet out of order, or network delay, as discussed further herein. To that end, the performance collectors 102, 104 actively collect network and call performance metrics to identify the portions of the system 100 that are causing the performance degradation, described further herein.

In some implementations, one or both of the probe performance collectors 102, 104 can determine a plurality of metrics of data trafficked through the SBC 106. In some examples, the SBC 106 is in communication with the one or more of the end-point devices 110 and positioned along the data transmission connection 112 between the network 107 and the IMS 108. Specifically, the parameters of data trafficked through the SBC 106 that are determined by the performance collectors 102, 104 can include two categories: i) TCP performance parameters and ii) VOIP performance parameters.

TCP performance parameters can include parameters related to SIP over SSL/TLS traffic between the end-point devices 110 and the SBC 106. The connection is a persistent TCP connection, with the TCP performance parameters including:
1) End-point Network Response Time (NRT): the network delay including end-point network response;
2) End-point Signaling Response Time (ART): the average time needed for the end-point device 110 to send two consecutive requests;
3) SBC Network Response Time (NRT): the average time taken by the SBC 106 to respond to connection initiating of end-point or acknowledging data;
4) SBC Signaling Response Time (ART): the average time taken by SBC 106 to process signaling (for example, time of other backend components such as CSCF); and
5) Retransmission: the number of signaling packets retransmitted either from the end-point device 110 or the SBC 106/IMS 108.

VOIP performance parameters are parameters related to the call, and are measured by processing the media (RTP and RTCP packets). The VOIP performance parameters can include:
1) Jitter: difference in media traffic delay;
2) Packet Loss: number of dropped packets; and
3) Out of Order: the packets with out of sequence.

To that end, any of the TCP performance parameters and the VOIP performance parameters are considered to be degraded if a threshold is exceeded. In some examples, the threshold is static or dynamic, and is based on the specific performance parameter. The dynamic threshold is a baseline and is calculated based on historical data. The threshold can be static where if this number is exceeded it would raise an alarm. An example would be: if the Jitter exceeds 20 ms this is considered to cross the threshold or if the application response is exceeding 5 sec. The threshold can also be dynamic and changing with time based on the knowledge of historical data. Any statistical methodology can be utilize to determine the abnormality on the results based on the historical data. Very simple example, we took the average of the historical data and then if the current response time is 100% more than the past data then we can trigger this as a degradation. I really want to make this open since there are many statistical methods that can be used.

The performance parameters (TCP and VOIP) can be based on the time of a single call or an average time of a group of calls. The timeframe for calculating the performance parameters can vary, but is consistent for all performance metrics. For example, the timeframe can be a specified interval such as every 500 millisecond, or a call duration where every call has the associated performance parameter calculated separately.

To that end, as shown in FIG. 1, in some examples, the performance parameters are measured using a single SBC-SBC 106. For example, both of end-point devices 110a, 110b have call traffic passing through the SBC 106. The probe performance collectors 102, 104 continuously measure the performance parameters for the traffic passing there through, for example, within a determined timeframe. In some examples, the end-point devices 110a, 110b call each other and at least one of the end-point devices 110a, 110b is registered with the SBC 106. The first probe performance collector 102 can correlate TCP (SIP over SSL) performance parameters with UDP (Media) performance parameters. In some examples, when the traffic includes encrypted traffic passing through the first probe performance collector 102, the SBC 106 can decrypt SIP and pass it to the second probe performance collector 104. This provides a correlation of application messages and errors with TCP (SIP over SSL) performance parameters.

Figure 2:
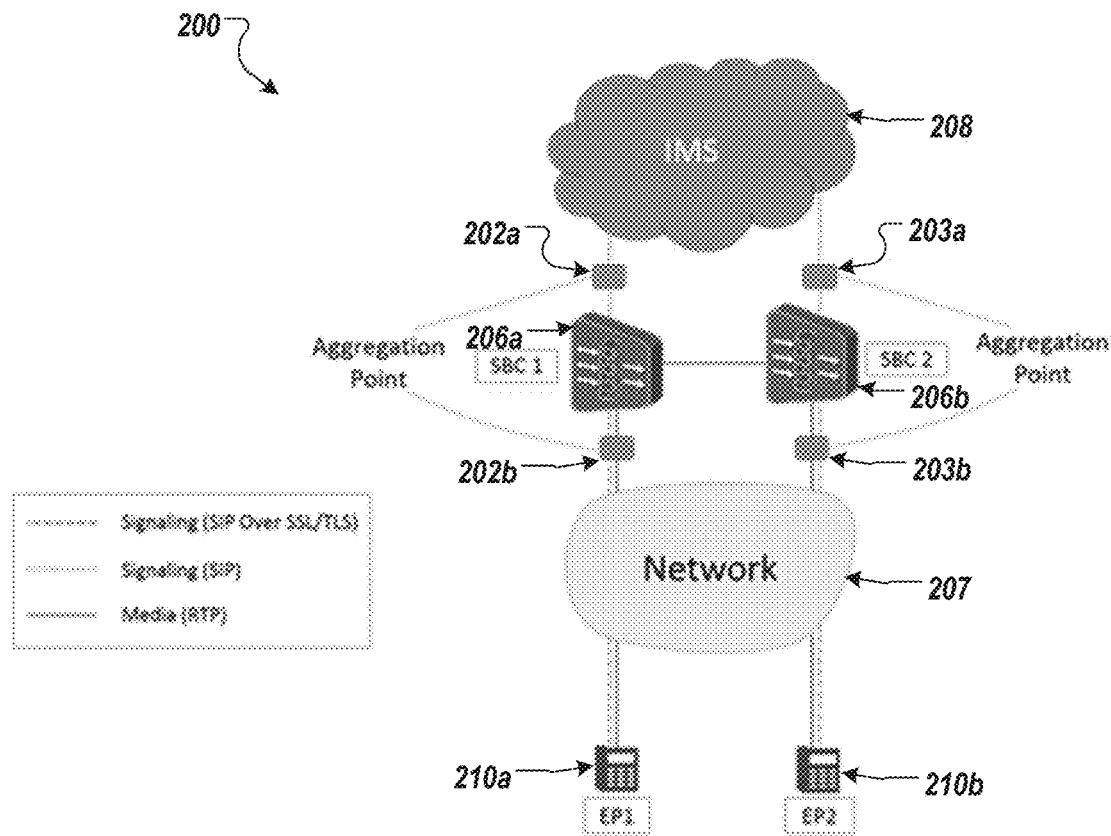

In some examples, the performance parameters are measured using two SBCs. Referring to FIG. 2, a computing environment 200 is shown that includes probe performance collectors 202a, 202b, probe performance collectors 203a, 203b, a first SBC 206a, a second SBC 206b, a network 207, an IMS 208, and end-point devices 210a, 210b. To that end, the computing system 200 illustrates a call setup scenario where the end-point devices 210a, 210b initiate TCP connections that represents signaling traffic (SIP over SSL/TLS). The media is transmitted from one of the end-points 210a, 210b to the respective SBC 206a, 206b through RTP protocol. The signaling from the SBC 206a, 20b to the IMS 208 can use SIP protocol. To that end, the end-point devices 210a, 210b have call traffic passing through respective SBCs 206a, 206b.

Figure 3:
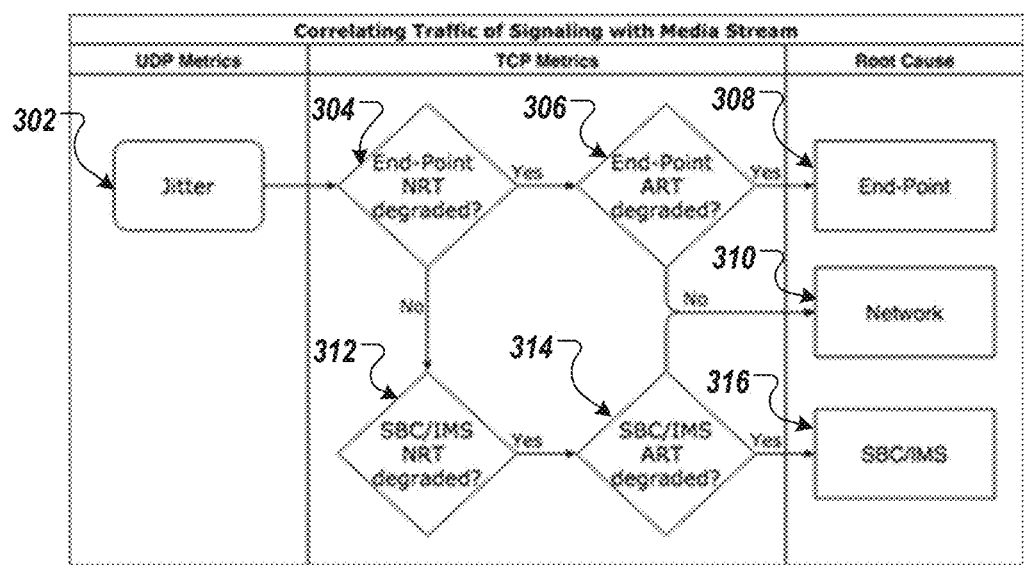
FIGS. 3 and 4 illustrate respective flowcharts for determining the root cause of unified communication performance degradation.

Referring to FIG. 3, a flowchart 300 that illustrates a method for determining the root cause of unified communication performance degradation. For clarity of presentation, the description that follows generally describes method 300 in the context of FIGS. 1 and 2. For example, as illustrated, particular steps of the method 300 may be performed on or at the computing system 100. However, method 300 may be performed, for example, by any other suitable system, environment, software, and hardware, or a combination of systems, environments, software, and hardware as appropriate. Operations of method 300 can include one or more optional steps, including only one or more of the steps being performed, and further, that the steps of FIG. 3 can be performed in any order.

The probe performance collectors 102, 104 detect a jitter performance metric of the data (network traffic) (302). For example, one of the probe performance collectors 102, 104 detects a jitter performance of the network traffic passing through the SBC 106. In response to detecting the jitter, the probe performance collectors 102, 104 determines whether an end-point network response time (NRT) is degraded (304). In some examples, the probe performance collectors 102, 104 determine that the end-point NRT is degraded. For example, one of the probe performance collectors 102, 104 determines that the end-point NRT is degraded when a threshold is exceeded for a predetermined timeframe. In some examples, the end-point NRT is a network delay that includes end-point network response. In response to determining that the end-point NRT is degraded, the probe performance collectors 102, 104 determine whether an end-point signaling response time (ART) is degraded (306). In some examples, the probe performance collectors 102, 104 determine that the end-point ART is degraded. For example, one of the probe performance collectors 102, 104 determines that the end-point ART is degraded when a threshold is exceeded for a predetermined timeframe. In some examples, the end-point ART is an average time for the end-point device 110 to send two consecutive requests. In response to determining that the end-point ART is degraded, the probe performance collectors 102, 104 identify the end-point device 110 as a root cause of the jitter performance metric of the data (308).

In some examples, in response to determining that the end-point NRT is degraded (at 304), the probe performance collectors 102, 104 determine that the end-point ART is not degraded (at 306). For example, one of the probe performance collectors 102, 104 determines that the end-point ART is not degraded when a threshold is not exceeded for a predetermined timeframe. In response to determining that the end-point ART is not degraded (at 306), the probe performance collectors 102, 104 identify the network 107 as the root cause of the jitter performance metric of the data (310).

In some examples, in response to detecting the jitter (at 302), the probe performance collectors 102, 104 determine that the end-point NRT is not degraded (at 304). For example, one of the probe performance collectors 102, 104 determines that the end-point NRT is not degraded when a threshold is not exceeded for a predetermined timeframe. In response to determining that the end-point NRT is not degraded (at 304), the probe performance collectors 102, 104 determine whether the SBC NRT is degraded (312). In some examples, the probe performance collectors 102, 104 determine that the SBC NRT is degraded. For example, one of the probe performance collectors 102, 104 determines that the SBC NRT is degraded when a threshold is exceeded for a predetermined timeframe. In some examples, the SBC NRT is an average time for the SBC 106 to respond to a connection. In response to determining that the SBC NRT is degraded, the probe performance collectors 102, 104 determine whether a SBC ART is degraded (314). In some examples, the probe performance collectors 102, 104 determine that the SBC ART is degraded. For example, one of the probe performance collectors 102, 104 determines that the SBC ART is degraded when a threshold is exceeded for a predetermined timeframe. In some examples, the SBC ART is an average time for the SBC to process signaling. In response to determining that the SBC ART is degraded, the performance collectors 102, 104 identify the SBC 106 and the IMS 108 as the root cause of the jitter performance metric of data (316).

In some examples, in response to determining that the SBC NRT is degraded (at 312), the probe performance collectors 102, 104 determine that the SBC ART is not degraded (at 314). For example, one of the probe performance collectors 102, 104 determines that the SBC NRT is not degraded when a threshold is not exceeded for a predetermined timeframe. In response to determining that the SBC ART is not degraded, the probe performance collectors 102, 104 identify the network as the root cause of the jitter performance metric of data (310).

Figure 4:
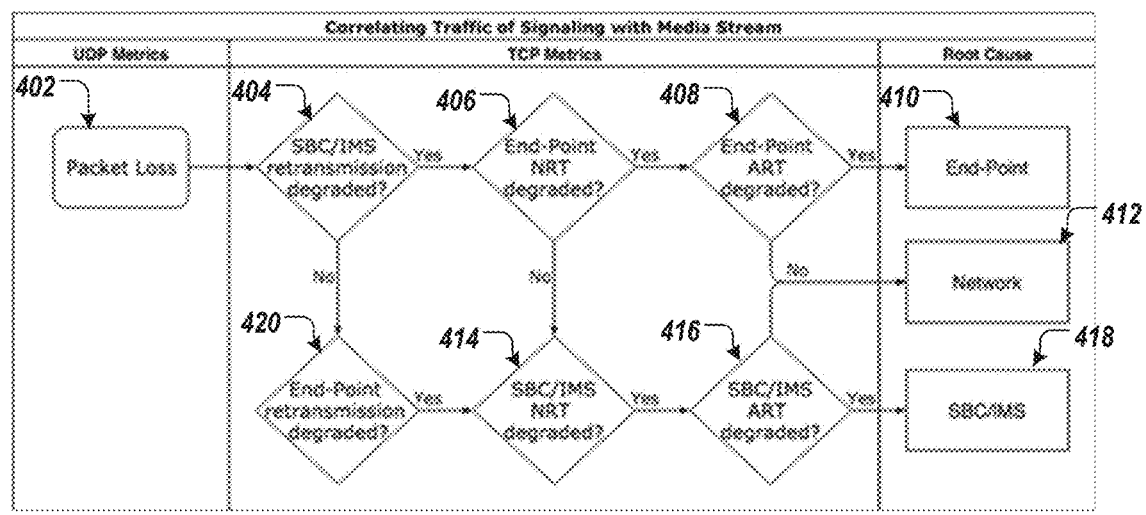

Referring to FIG. 4, a flowchart 400 that illustrates a method for determining the root cause of unified communication performance degradation. For clarity of presentation, the description that follows generally describes method 400 in the context of FIGS. 1 and 2. For example, as illustrated, particular steps of the method 400 may be performed on or at the computing system 100. However, method 400 may be performed, for example, by any other suitable system, environment, software, and hardware, or a combination of systems, environments, software, and hardware as appropriate. Operations of method 400 can include one or more optional steps, including only one or more of the steps being performed, and further, that the steps of FIG. 4 can be performed in any order.

The probe performance collectors 102, 104 detect a packet loss performance metric of the data (network traffic) (402). For example, one of the probe performance collectors 102, 104 detects a packet loss performance metric of the network traffic passing through the SBC 106. In response to detecting the packet loss, the probe performance collectors 102, 104 determine whether a retransmission of the SBC is degraded (404). In some examples, the probe performance collectors 102, 104 determine that the retransmission of the SBC 106 is degraded. For example, one of the probe performance collectors 102, 104 determines that the retransmission of the SBC 106 is degraded when a threshold is exceeded for a predetermined timeframe. In some examples, retransmission of the SBC 106 is a number of signaling packets retransmitted from the SBC 106. In response to determining that the retransmissions of the SBC is degraded, the probe performance collectors 102, 104 determine whether an end-point network response time (NRT) is degraded (406). In some examples, the probe performance collectors 102, 104 determine that the end-point NRT is degraded. For example, one of the probe performance collectors 102, 104 determines that the end-point NRT is degraded when a threshold is exceeded for a predetermined timeframe. In some examples, the end-point NRT is a network delay including end-point network response.

In response to determining that the end-point NRT is degraded, the probe performance collectors 102, 104 determine whether an end-point signaling response time (ART) is degraded (408). In some examples, the probe performance collectors 102, 104 determine that the end-point ART is degraded. For example, one of the probe performance collectors 102, 104 determines that the end-point ART is degraded when a threshold is exceeded for a predetermined timeframe. In some examples, the end-point ART is an average time for the end-point to send two consecutive requests. In response to determining that the end-point ART is degraded, the probe performance collectors 102, 104 identify the end-point device 110 as a root cause of the packet loss performance metric of the data (410).

In some examples, in response to determining that the end-point NRT is degraded (at 408), the probe performance collectors 102, 104 determine that the end-point ART is not degraded. For example, one of the probe performance collectors 102, 104 determines that the end-point ART is not degraded when a threshold is not exceeded for a predetermined timeframe. In response to determining that the end-point ART is not degraded (at 408), the probe performance collectors 102, 104 identify the network 107 as a root cause of the packet loss performance metric of the data (412).

In some examples, in response to determining that the retransmission of the SBC is degraded (at 404), the probe performance collectors 102, 104 determine that the end-point NRT is not degraded (at 406). For example, one of the probe performance collectors 102, 104 determines that the end-point NRT is not degraded when a threshold is not exceeded for a predetermined timeframe. In response to determining that the end-point NRT is not degraded, the probe performance collectors 102, 104 determine whether a SBC NRT is degraded (414). In some examples, the probe performance collectors 102, 104 determine that the SBC NRT is degraded. For example, one of the probe performance collectors 102, 104 determines that the SBC NRT is degraded when a threshold is exceeded for a predetermined timeframe. In some examples, the SBC NRT is an average time for the SBC 106 to respond to a connection. In response to determining that the SBC NRT is degraded, the probe performance collectors 102, 104 determine whether the SBC ART is degraded (416). In some examples, the probe performance collectors 102, 104 determine that the SBC ART is degraded. For example, one of the probe performance collectors 102, 104 determines that the SBC ART is degraded when a threshold is exceeded for a predetermined timeframe. In some examples, the SBC ART is an average time for the SBC to process signaling. In response to determining that the SBC ART is degraded, the probe performance collectors 102, 104 identify the SBC 106 and the IMS 108 as a root cause of the packet loss performance metric of the data (418).

In some examples, in response to determining that the SBC NRT is degraded (at 414), the probe performance collectors 102, 104 determine that the SBC ART is not degraded (at 416). For example, one of the probe performance collectors 102, 104 determines that the SBC ART is not degraded when a threshold is not exceeded for a predetermined timeframe. In response to determining that the SBC ART is not degraded, the probe performance collectors 102, 104 identify network 107 as a root cause of the packet loss performance metric of the data (412).

In some examples, in response to detecting the packet loss (at 402), the probe performance collectors 102, 104 determine that the retransmission of the SBC is not degraded (at 404). For example, one of the probe performance collectors 102, 104 determines that the retransmission of the SBC is not degraded when a threshold is not exceeded for a predetermined timeframe. In response to determining that the retransmission of the SBC is not degraded, the probe performance collectors 102, 104 determining whether a retransmission of the end-point is degraded (420). In some examples, the probe performance collectors 102, 104 determine that the retransmission of the end-point is degraded. For example, one of the probe performance collectors 102, 104 determines that the retransmission of the SBC is degraded when a threshold is exceeded for a predetermined timeframe. In some examples, the retransmission of the end-point is a number of signaling packets retransmitted from the end-point.

In response to determining that the retransmission of the end-point is degraded, the probe performance collectors 102, 104 determine whether the SBC NRT is degraded (414). In some examples, the probe performance collectors 102, 104 determine that the SBC NRT is degraded. For example, one of the probe performance collectors 102, 104 determines that the SBC NRT is degraded when a threshold is exceeded for a predetermined timeframe. In response to determining that the SBC NRT is degraded, the probe performance collectors 102, 104 determine whether the SBC ART is degraded (416). In some examples, the probe performance collectors 102, 104 determine that the SBC ART is degraded. For example, one of the probe performance collectors 102, 104 determines that the SBC ART is degraded when a threshold is exceeded for a predetermined timeframe. In response to determining that the SBC ART is degraded, the probe performance collectors 102, 104 identify the SBC 106 and the IMS as a root cause of the packet loss performance metric of the data (418).

Figure 5:
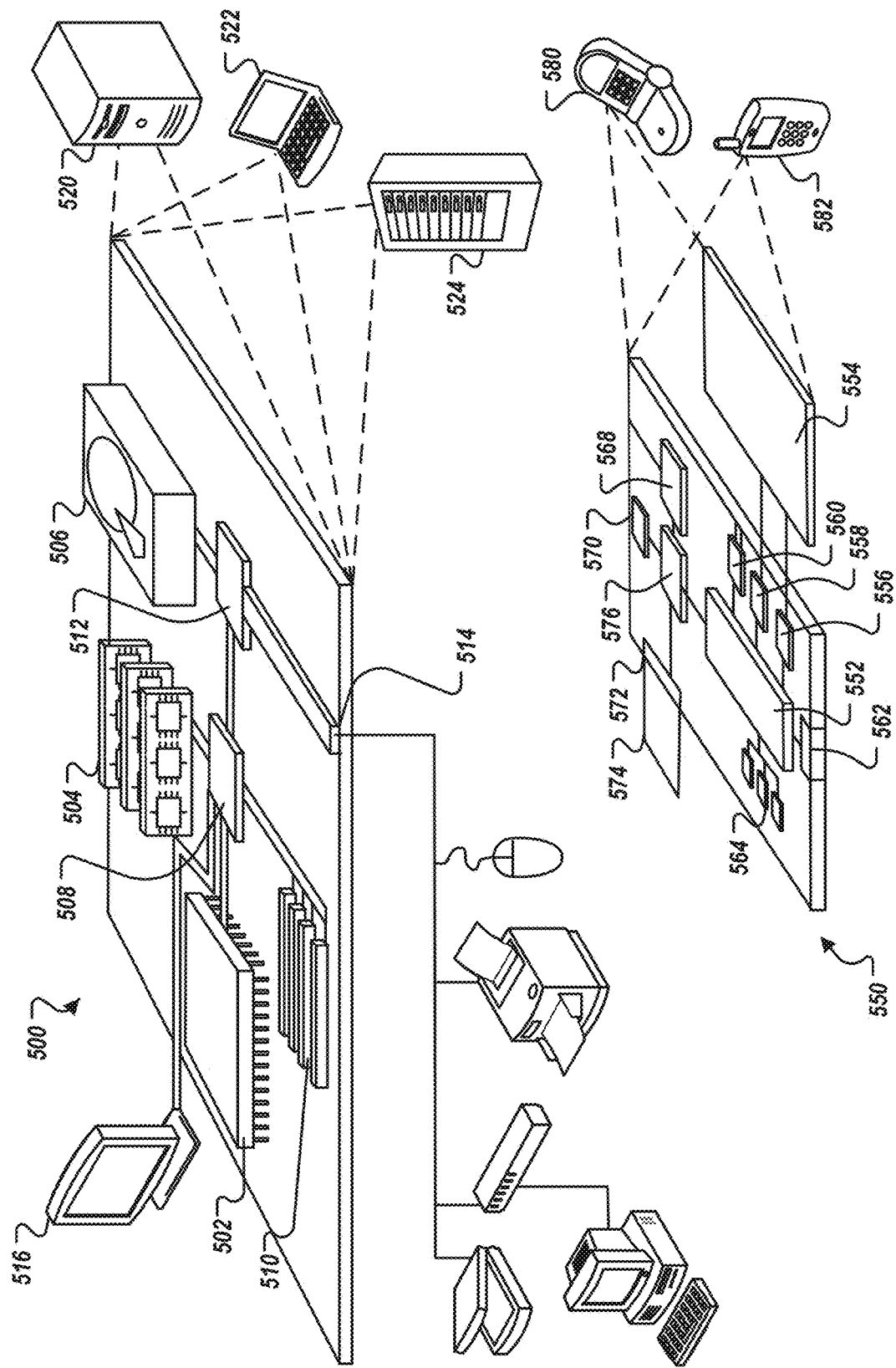
FIG. 5 illustrates an example computing environment for implementing the techniques described herein.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (for example, as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, or a memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (for example, through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (for example, USB, Bluetooth, Ethernet, wireless Ethernet) may be coupled to one or more input/output devices, such as a keyboard, a pointing device, a scanner, or a networking device such as a switch or router, for example, through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 640, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 548 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 554 may also be provided and connected to device 550 through expansion interface 552, which may include, for example, a SIMM (Single In Line Memory Module) card interface. Such expansion memory 554 may provide extra storage space for device 550, or may also store applications or other information for device 550. Specifically, expansion memory 554 may include instructions to carry out or supplement the processes described above, and may include secure information also. Thus, for example, expansion memory 554 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 554, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 550 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, for example, in a handset of device 550. Such sound may include sound from voice telephone calls, may include recorded sound (for example, voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here may be realized in digital circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (for example, magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (for example, a CRT (cathode ray tube) or LCD (liquid crystal display) monitor) for displaying information to the user and a keyboard and a pointing device (for example, a mouse or a trackball) by which the user may provide input to the computer. Other kinds of devices may be used to provide for interaction with a user as well; for example, feedback provided to the user may be any form of sensory feedback (for example, visual feedback, auditory feedback, or tactile feedback); and input from the user may be received in any form, including acoustic, speech, or tactile input.

The systems and techniques described here may be implemented in a computing system that includes a back end component (for example, as a data server), or that includes a middleware component (for example, an application server), or that includes a front end component (for example, a client computer having a graphical user interface or a Web browser through which a user may interact with an implementation of the systems and techniques described here), or any combination of such back end, middleware, or front end components. The components of the system may be interconnected by any form or medium of digital data communication (for example, a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method, comprising:
   determining a plurality of metrics of data trafficked through a session border controller (SBC), the SBC in communication with an endpoint device and positioned along a data transmission connection between a network and a IP multi-media subsystem (IMS);
   detecting a packet loss performance metric of the data is degraded;
   in response to detecting the packet loss, determining a first degradation status for a retransmission of the SBC;
   in response to determining that the first degradation status indicates that the retransmission of the SBC is degraded:
      determining a second degradation status for an endpoint network response time (NRT);
      in response to determining that the second degradation status indicates that the endpoint NRT is degraded, determining a third degradation status for an endpoint signaling response time (ART); and
      in response to determining that the third degradation status indicates that the endpoint ART is degraded, identifying the endpoint device as a root cause of the packet loss performance metric of the data; and
   in response to determining that the first degradation status indicates that the retransmission of the SBC is not degraded:
      determining a fourth degradation status for a SBC NRT; and
      in response to determining that the fourth degradation status indicates that the SBC NRT is degraded:
         determining a fifth degradation status for a SBC ART.

2. The computer-implemented method of claim 1, further comprising:

in response to determining that the second degradation status indicates that the endpoint NRT is degraded, determining that the third degradation status for the endpoint ART indicates that the endpoint ART is not degraded; and in response to determining that third degradation status indicates that the endpoint ART is not degraded, identifying the network as the root cause of degradation represented by the packet loss performance metric of the data.

3. The computer-implemented method of claim 1, wherein the endpoint NRT is a network delay including endpoint network response.

4. The computer-implemented method of claim 1, wherein the endpoint ART is an average time for the endpoint to send two consecutive requests.

5. The computer-implemented method of claim 1, wherein retransmission of the SBC is a number of signaling packets retransmitted from the SBC.

6. The computer-implemented method of claim 1, further comprising:
   in response to determining that the first degradation status indicates that the retransmission of the SBC is degraded, determining that the second degradation status indicates that the endpoint NRT is not degraded;
   in response to determining that the second degradation status indicates that the endpoint NRT is not degraded, determining that the fourth degradation status indicates that the SBC NRT is degraded;
   in response to determining that the fourth degradation status indicates that the SBC NRT is degraded, determining that the fifth degradation status for the SBC ART indicates that the SBC ART is degraded; and
   in response to determining that the fifth degradation status indicates that the SBC ART is degraded, identifying the SBC and the IMS as the root cause of degradation represented by the packet loss performance metric of the data.

7. The computer-implemented method of claim 6, further comprising:
   in response to determining that the fourth degradation status indicates that the SBC NRT is degraded, determining that the fifth degradation status indicates that the SBC ART is not degraded;
   in response to determining that the fifth degradation status indicates that the SBC ART is not degraded, identifying the network as the root cause of the packet loss performance metric of data.

8. The computer-implemented method of claim 6, wherein the SBC NRT is an average time for the SBC to respond to a connection.

9. The computer-implemented method of claim 6, wherein the SBC ART is an average time for SBC to process signaling.

10. The computer-implemented method of claim 1, further comprising:
   in response to detecting the packet loss, determining that the retransmission of the SBC is not degraded;
   in response to determining that the first degradation status indicates that the retransmission of the SBC is not degraded, determining a sixth degradation status for the endpoint indicating that a retransmission of the endpoint is degraded;
   in response to determining that the sixth degradation status indicates that the retransmission of the endpoint is degraded, determining that the fifth degradation status indicates that the SBC ART is degraded; and in response to determining that the fifth degradation status indicates that the SBC ART is degraded, identifying the SBC and the IMS as the root cause of the packet loss performance metric of data.

11. The computer-implemented method of claim 10, wherein the retransmission of the endpoint is a number of signaling packets retransmitted from the endpoint.

12. A system, comprising:
   one or more processors; and
   a non-transitory computer-readable storage medium coupled to the one or more processors and storing programming instructions for execution by the one or more processors, the programming instructions instruct the one or more processors to perform operations comprising:
      determining a plurality of metrics of data trafficked through a session border controller (SBC), the SBC in communication with an endpoint device and positioned along a data transmission connection between a network and a IP multi-media subsystem (IMS);
      detecting a packet loss performance metric of the data is degraded;
      in response to detecting the packet loss, determining a first degradation status for a retransmission of the SBC;
      in response to determining that the first degradation status indicates that the retransmission of the SBC is degraded:
         determining a second degradation status for an endpoint network response time (NRT);
         in response to determining that the second degradation status indicates that the endpoint NRT is degraded, determining a third degradation status for an endpoint signaling response time (ART); and
         in response to determining that the third degradation status indicates that the endpoint ART is degraded, identifying the endpoint device as a root cause of the packet loss performance metric of the data; and
      in response to determining that the first degradation status indicates that the retransmission of the SBC is not degraded:
         determining a fourth degradation status for a SBC NRT; and
         in response to determining that the fourth degradation status indicates that the SBC NRT is degraded:
            determining a fifth degradation status for a SBC ART.

13. The system of claim 12, the operations further comprising:
   in response to determining that the second degradation status indicates that the endpoint NRT is degraded, determining that the third degradation status for the endpoint ART indicates that the endpoint ART is not degraded; and
   in response to determining that third degradation status indicates that the endpoint ART is not degraded, identifying the network as the root cause of degradation represented by the packet loss performance metric of the data.

14. The system of claim 12, the operations further comprising:
   in response to determining that the first degradation status indicates that the retransmission of the SBC is degraded, determining that the second degradation status indicates that the endpoint NRT is not degraded;

in response to determining that the second degradation status indicates that the endpoint NRT is not degraded, determining that the fourth degradation status indicates that the SBC NRT is degraded;

in response to determining that the fourth degradation status indicates that the SBC NRT is degraded, determining that the fifth degradation status for the SBC ART indicates that the SBC ART is degraded; and in response to determining that the fifth degradation status indicates that the SBC ART is degraded, identifying the SBC and the IMS as the root cause of degradation represented by the packet loss performance metric of the data.

15. The system of claim 14, the operations further comprising:

in response to determining that the fourth degradation status indicates that the SBC NRT is degraded, determining that the fifth degradation status indicates that the SBC ART is not degraded;

in response to determining that the fifth degradation status indicates that the SBC ART is not degraded, identifying the network as the root cause of the packet loss performance metric of data.

16. The system of claim 12, the operations further comprising:

in response to detecting the packet loss, determining that the retransmission of the SBC is not degraded;

in response to determining that the first degradation status indicates that the retransmission of the SBC is not degraded, determining a sixth degradation status for the endpoint indicating that a retransmission of the endpoint is degraded;

in response to determining that the sixth degradation status indicates that the retransmission of the endpoint is degraded, determining that the fifth degradation status indicates that the SBC ART is degraded; and in response to determining that the fifth degradation status indicates that the SBC ART is degraded, identifying the SBC and the IMS as the root cause of the packet loss performance metric of data.

17. A non-transitory computer readable medium storing instructions to cause one or more processors to perform operations comprising:

determining a plurality of metrics of data trafficked through a session border controller (SBC), the SBC in communication with an endpoint device and positioned along a data transmission connection between a network and a IP multi-media subsystem (IMS);

detecting a packet loss performance metric of the data is degraded;

in response to detecting the packet loss, determining a first degradation status for a retransmission of the SBC;

in response to determining that the first degradation status indicates that the retransmission of the SBC is degraded:

determining a second degradation status for an endpoint network response time (NRT);

in response to determining that the second degradation status indicates that the endpoint NRT is degraded, determining a third degradation status for an endpoint signaling response time (ART); and in response to determining that the third degradation status indicates that the endpoint ART is degraded, identifying the endpoint device as a root cause of the packet loss performance metric of the data; and in response to determining that the first degradation status indicates that the retransmission of the SBC is not degraded:

determining a fourth degradation status for a SBC NRT; and in response to determining that the fourth degradation status indicates that the SBC NRT is degraded:

determining a fifth degradation status for a SBC ART.

18. The non-transitory computer readable medium of claim 17, the operations further comprising:

in response to determining that the second degradation status indicates that the endpoint NRT is degraded, determining that the third degradation status for the endpoint ART indicates that the endpoint ART is not degraded; and in response to determining that third degradation status indicates that the endpoint ART is not degraded, identifying the network as the root cause of degradation represented by the packet loss performance metric of the data.

19. The non-transitory computer readable medium of claim 17, the operations further comprising:

in response to determining that the first degradation status indicates that the retransmission of the SBC is degraded, determining that the second degradation status indicates that the endpoint NRT is not degraded;

in response to determining that the second degradation status indicates that the endpoint NRT is not degraded, determining that the fourth degradation status indicates that the SBC NRT is degraded;

in response to determining that the fourth degradation status indicates that the SBC NRT is degraded, determining that the fifth degradation status for the SBC ART indicates that the SBC ART is degraded; and in response to determining that the fifth degradation status indicates that the SBC ART is degraded, identifying the SBC and the IMS as the root cause of degradation represented by the packet loss performance metric of the data.

20. The non-transitory computer readable medium of claim 17, the operations further comprising:

in response to determining that the fourth degradation status indicates that the SBC NRT is degraded, determining that the fifth degradation status indicates that the SBC ART is not degraded;

in response to determining that the fifth degradation status indicates that the SBC ART is not degraded, identifying the network as the root cause of the packet loss performance metric of data.

* * * * *